(12) United States Patent
Ye

(10) Patent No.: US 10,415,209 B2
(45) Date of Patent: Sep. 17, 2019

(54) CELLULAR CONFINEMENT SYSTEM AND MANUFACTURING METHOD THEREOF

(71) Applicant: ANHUI HUIFENG NEW SYNTHETIC MATERIALS CO., LTD., Hefei, Anhui (CN)

(72) Inventor: Lei Ye, Hefei (CN)

(73) Assignee: ANHUI HUIFENG NEW SYNTHETIC MATERIALS CO., LTD., Hefei, Anhui (CN)

( * ) Notice: Subject to any disclaimer, the term of this patent is extended or adjusted under 35 U.S.C. 154(b) by 165 days.

(21) Appl. No.: 15/244,305

(22) Filed: Aug. 23, 2016

(65) Prior Publication Data

US 2017/0284053 A1   Oct. 5, 2017

(30) Foreign Application Priority Data

Apr. 5, 2016  (CN) .......................... 2016 1 0209818

(51) Int. Cl.
*B32B 3/12* (2006.01)
*E02D 29/02* (2006.01)
(Continued)

(52) U.S. Cl.
CPC ........ *E02D 29/0208* (2013.01); *B29C 55/005* (2013.01); *B29D 99/0089* (2013.01);
(Continued)

(58) Field of Classification Search
USPC ................................................ 428/116, 117
See application file for complete search history.

(56) References Cited

U.S. PATENT DOCUMENTS

2009/0324346 A1    12/2009  Milton et al.
2010/0080659 A1*    4/2010  Halahmi ................ E02D 17/18
                                                                 405/302.4

FOREIGN PATENT DOCUMENTS

CN      102061688 A     5/2011
CN      203498818 U     3/2014
(Continued)

OTHER PUBLICATIONS

JP201517375 English machine translation.*
(Continued)

*Primary Examiner* — Lauren R Colgan
(74) *Attorney, Agent, or Firm* — Yue (Robert) Xu; Apex Attorneys at Law, LLP

(57) ABSTRACT

A cellular confinement system includes PET sheets and honeycomb-shaped cells formed by intercrossing the PET sheets. A connecting hole is provided at a joint where the PET sheets are intercrossed. An injection molded fixing component for connecting the PET sheets is provided at the connecting hole. The injection molded fixing component includes an injection molded rod arranged in the connecting hole and fixing plates each arranged to be fixedly connected to a corresponding end of two ends of the injection molded rod. The fixing plates each fits against a side wall of a corresponding PET sheet. The injection molded fixing component includes the injection molded rod and the fixing piece. The injection molded rod is configured to connect the PET sheets at the joint where the PET sheets are intercrossed. The fixing plate is configured to prevent the PET sheets from being disengaged from the injection molded rod.

2 Claims, 3 Drawing Sheets

(51) Int. Cl.
  *B29C 55/00* (2006.01)
  *B29D 99/00* (2010.01)
  *B29C 45/14* (2006.01)
  *B29K 667/00* (2006.01)
  *B29L 31/60* (2006.01)
  *B29C 55/10* (2006.01)
  *B29K 67/00* (2006.01)

(52) U.S. Cl.
  CPC ........ *B29C 45/14467* (2013.01); *B29C 55/10* (2013.01); *B29K 2067/003* (2013.01); *B29K 2667/003* (2013.01); *B29L 2031/608* (2013.01)

(56) References Cited

FOREIGN PATENT DOCUMENTS

| CN | 103850238 A | 6/2014 |
|---|---|---|
| CN | 205636712 U | 10/2016 |
| JP | S60-169339 U | 11/1985 |
| JP | H10-044247 | 2/1998 |
| JP | H10044247 * | 2/1998 |
| JP | 2012011619 * | 1/2012 |
| JP | 2012508125 A | 4/2012 |
| JP | 201517375 * | 1/2015 |
| JP | 2015017375 | 1/2015 |
| KR | 20060036626 A | 5/2006 |
| KR | 100801480 B1 | 2/2008 |
| WO | 2010053783 A2 | 5/2010 |

OTHER PUBLICATIONS

JP2012011619 English machine translation.*
JPH10044247 English machine translation.*
First Office Action regarding corresponding Japanese Application No. 2016-156225 dated Nov. 22, 2017.English translation provided by https://globaldossier.uspto.gov.
Summary of the Chinese 1st Office Action for CN201610209818.3, dated May 19, 2017.

* cited by examiner

CELLULAR CONFINEMENT SYSTEM AND MANUFACTURING METHOD THEREOF

CROSS-REFERENCE TO RELATED APPLICATIONS

The present application claims the benefit of priority to Chinese patent application No. 201610209818.3 titled "CELLULAR CONFINEMENT SYSTEM AND MANUFACTURING METHOD THEREOF", filed with the Chinese State Intellectual Property Office on Apr. 5, 2016, the entire disclosure of which is incorporated herein by reference.

FIELD

This application relates to the technical field of civil engineering construction, and particularly to a cellular confinement system and a manufacturing method thereof.

BACKGROUND

A cellular confinement system is a civil engineering material which is formed by connecting sheets through a certain connection way, and has a three-dimensional mesh structure and a reinforcing effect in a vertical direction and an effective whole confining effect. The cellular confinement system may ensure minimum height of a fill to the greatest extent in some special area and allow the fill to have high quality strength and rigidity.

The cellular confinement system is generally connected by riveting, inserting, welding and etc.

Although the strength of connection points of the cellular confinement system is improved in the riveting or inserting cellular confinement system, the cellular confinement system is apt to be corroded and thus the service life is affected in practical use because connecting pieces of the cellular confinement system mainly use metal pieces. Although the cellular confinement system has no metal connecting pieces, the cellular confinement system has relatively low weld strength. Therefore, the use of such a cellular confinement system is also limited.

SUMMARY

In view of this, an object of the present application is to provide a cellular confinement system, which has strong connection strength and an effectively prolonged service life. A method for manufacturing the cellular confinement system is further provided according to the present application, by which, the cellular confinement system may be easily manufactured and cost-effective, and has high connection strength and a long service life.

In order to address the above technical issues, a cellular confinement system is provided according to the present application. The cellular confinement system includes PET sheets and honeycomb-shaped cells formed by the PET sheets intercrossing. A connecting hole is provided at a joint where the PET sheets are intercrossed. An injection molded fixing component for connecting the PET sheets is provided at the connecting hole. The injection molded fixing component includes an injection molded rod arranged in the connecting hole and fixing plates each arranged to be fixedly connected to a corresponding end of two ends of the injection molded rod and each of the fixing plates fits against a side wall of a corresponding PET sheet.

Preferably, the number of the connecting hole is two or more.

Preferably, the number of the connecting hole is three.

Preferably, the connecting holes are equally spaced.

Preferably, two adjacent fixing plates are integrated.

Preferably, the cellular confinement system is constituted by one PET sheet or two or more PET sheets.

According to the present application, a method for manufacturing the cellular confinement system is further provided. The method includes:
1) intercrossing PET sheets to form honeycomb-shaped cells;
2) providing a connecting hole at a joint where the PET sheets are intercrossed; and
3) providing an injection molded fixing component at the connecting hole.

The step 1) includes:
11) intercrossing one PET sheet or two or more PET sheets; and
12) stretching the one PET sheet or the two or more PET sheets to form honeycomb-shaped cells.

The step 2) includes:
21) providing two or more connecting holes, which are parallel and equally spaced, at a joint where the PET sheets 1 are intercrossed.

The step 3) includes:
31) injecting molten plastic into each of the connecting holes by using a plastic injection molding machine to form a injection molded rod;
32) injecting the molten plastic to two ends of the injection molded rod by using the plastic injection molding machine to form fixing plates each at a corresponding end of the injection molded rod; and
33) integrating the fixing plates by using the plastic injection molding machine.

In the cellular confinement system according to the present application, firstly, PET sheets are intercrossed to form honeycomb-shaped cells, and a connecting hole is provided at the joint where the PET sheets are intercrossed, and then the PET sheets are connected by an injection molded fixing component at the joint where the PET sheets are intercrossed. The injection molded fixing component includes an injection molded rod arranged in the connecting hole and fixing plates each arranged to be fixedly connected to a corresponding end of two ends of the injection molded rod. The injection molded rod is used for connecting the PET sheets at the joint where the PET sheets are intercrossed. The PET sheets may be fixed by the fixing plates, thus preventing the PET sheets from being disengaged from the injection molded rod. Each of the fixing plate fit against a side wall of a corresponding PET sheet. In this way, the PET sheets may fit closely against each other. Since the PET sheets have a high high-temperature resistance, the PET sheets are not deteriorated due to high temperature in plastic injection process. Also since the injection molded connecting component is formed by converting liquid into solid, the connection between the sheets is more secure. Therefore, the whole strength of the cellular confinement system is improved and the service life of the cellular confinement system is also prolonged.

A method for manufacturing the cellular confinement system is further provided according to the present application. In the method for manufacturing the cellular confinement system, PET sheets are intercrossed to form honeycomb-shaped cells, then a connecting hole is provided at a joint where the PET sheets are intercrossed, and finally, an injection molded fixing component is provided at the connecting hole to fix the PET sheets into an integral part at the joint where the PET sheets are connected. Since PET sheets have a high high-temperature resistance, the PET sheets are not deteriorated due to high temperature in plastic injection process. Also since the injection molded connecting component is formed by converting liquid into solid, the connection between the sheets is more secure. Therefore, the whole strength of the cellular confinement system is improved and the service life of the cellular confinement system is also prolonged.

BRIEF DESCRIPTION OF THE DRAWINGS

For more clearly illustrating embodiments of the present application, drawings referred to describe the embodiments will be briefly described hereinafter. Apparently, the drawings in the following description are only some examples of the present application, and for the person skilled in the art, other drawings may be obtained based on these drawings without any creative efforts.

Figure 1:
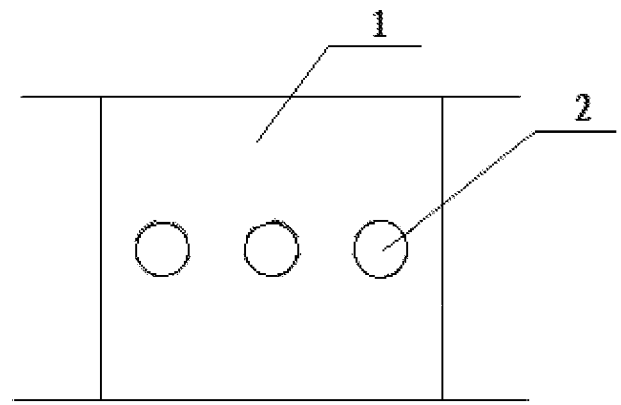
FIG. 1 is a schematic view showing the structure of a joint, where PET sheets of a cellular confinement system according to the present application are connected, before an injection molded fixing component is mounted.

In the drawings, 1 denotes a PET sheet, 2 denotes a connecting hole, 3 denotes an injection molded fixing component, 31 denotes an injection molded rod, and 32 denotes a fixing plate.

DETAILED DESCRIPTION

The technical solutions of the embodiments of the present application will be described clearly and completely hereinafter in conjunction with the drawings of the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

In order to make those skilled in the art better understand the solutions of the present application, the present application is further illustrated in detail hereinafter in conjunction with the drawings and specific embodiments.

Figure 2:
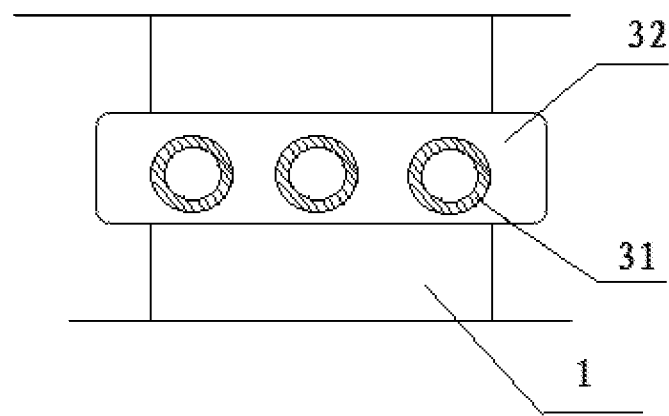
FIG. 2 is a schematic view showing the structure of the joint, where the PET sheets of the cellular confinement system according to the present application are connected, after an injection molded fixing component is mounted.

Reference is made to FIGS. 1 and 2. FIG. 1 is a schematic view showing the structure of a joint, where PET sheets of a cellular confinement system according to the present application are connected, before an injection molded fixing component is mounted. FIG. 2 is a schematic view showing the structure of the joint, where the PET sheets of a cellular confinement system according to the present application are connected, after an injection molded fixing component is mounted.

The cellular confinement system according to the present application includes PET sheets 1 and honeycomb-shaped cells formed by the PET sheets 1 being intercrossed. A connecting hole 2 is provided at a joint where the PET sheets 1 are intercrossed. An injection molded fixing component 3 for connecting the PET sheets 1 is provided at the connecting hole 2. The injection molded fixing component 3 includes an injection molded rod 31 arranged in the connecting hole 2 and fixing plates 32 each arranged to be fixedly connected to a corresponding end of two ends of the injection molded rod 31. Each of the fixing plate 32 fits against a side wall of a corresponding PET sheet 1.

Firstly, the PET sheets 1 are intercrossed to form the honeycomb-shaped cellular confinement system. Then, the PET sheets 1 are connected by the injection molded fixing component 3 at the joint where the PET sheets 1 are intercrossed.

Those skilled in the art may understand that injection molding is a way of producing and molding industrial products in which thermoplastic is made into plastic products of various shapes by utilizing plastic forming moulds.

Therefore, the injection molded fixing component 3 includes the injection molded rod 31 arranged in the connecting hole 2 and the fixing plates 32 each arranged to be fixedly connected to the corresponding end of the two ends of the injection molded rod 31.

In working process, firstly, the joint where the PET sheets 1 are intercrossed is punched, i.e., is provided with a connecting hole 2. Then, plastic is injected into the connecting hole 2 by using a plastic injection molding machine. After being cooled, the plastic is shaped and thus formed into an injection molded rod 31. Also each of the fixing plates 32 is injection molded at the corresponding end of the two ends of the injection molded rod 31.

It should be illustrated that the PET sheets 1 have a strong high-temperature resistance. Therefore, in the process of injection molding, the PET sheets 1 are neither deteriorated due to high temperature nor damaged. Also the strength of the PET sheets 1 may not be changed.

It is to be emphasized that the injection molded rod 31 may be injection molded as a solid injection molded rod and may also be injection molded as a hollow injection molded rod. Apparently, cavities may present in the middle of a rod body of a solid injection molded rod in plastic injection process and thus connection strength is reduced. However, a hollow injection molded rod has a better performance and high connection strength, and is not easily damaged.

In the cellular confinement system according to the present application, the injection molded fixing component is provided at the joint where the PET sheets 1 are connected. Since the injection molded connecting component is formed by converting liquid into solid and the liquid is integrated with the sheets after contacting with the sheets, the connection between the sheets is more secure and thus the whole strength of the cellular confinement system is improved. Therefore, the service life of the cellular confinement system is also prolonged.

In a specific embodiment of the present application, multiple connecting holes 2 are provided. With the multiple connecting holes 2, i.e., multiple connection points being provided at the joint where the PET sheets 1 are connected, the connection strength between the PET sheets 1 may be effectively improved and thus the overall connection effect and the overall connection strength of the cellular confinement system are improved. Further, the service life of the cellular confinement system is prolonged.

In order to further optimize the above embodiment, three connecting holes 2 are provided. Those skilled in the art may understand that the area of the joint, where the PET sheets 1 are connected, is limited. Therefore, with three connecting holes 2 being provided, not only a high-strength connection may be achieved in a certain extent of the joint where the PET sheets 1 are connected, but also the cost will not be increased and the strength of the PET sheet 1 will not be reduced because not too many connecting holes 2 are provided.

Further, the multiple connecting holes 2 are equally spaced. With the connecting holes 2 being equally spaced, the connecting holes 2 are uniformly stressed when being subjected to a tensile force, thus avoiding the phenomenon that the connecting holes 2 are unevenly stressed and further avoiding cracks.

In a specific embodiment of the present application, two adjacent fixing plates 32 are integrated. After the two adjacent fixing plates 32 are integrated, the whole strength of the injection molded fixing component 3 may be effectively improved and thus the connection of the PET sheets 1 is more secure. In this way, the whole strength of the cellular confinement system is further improved and thus the service life of the cellular confinement system is also prolonged.

In order to further optimize the above embodiments, the cellular confinement system may be constituted by one PET sheet or multiple PET sheets 1. Those skilled in the art may understand that the cellular confinement system may be formed by bending one PET sheet 1 into a certain extent or by intercrossing multiple PET sheets 1.

Figure 3:
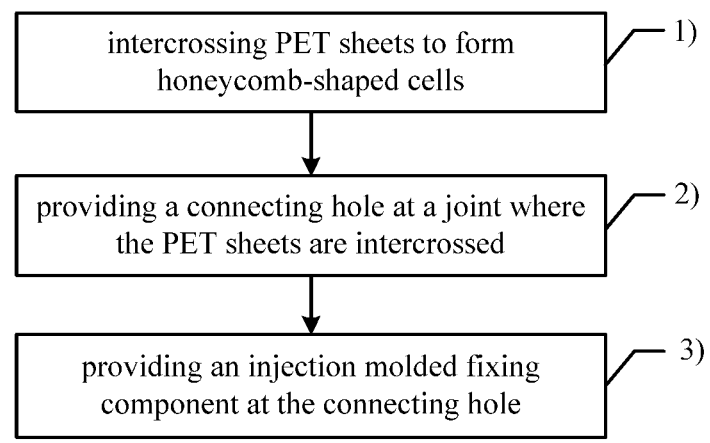
FIG. 3 is a flow chart of a cellular confinement system manufacturing method according to the present application.
Figure 4:
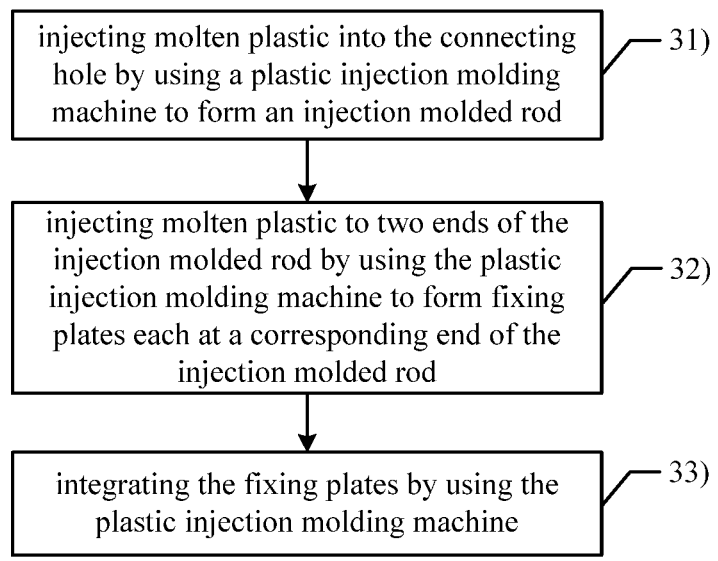
FIG. 4 is a flow chart of a specific embodiment of steps of the cellular confinement system manufacturing method according to the present application.

Reference is made to FIGS. 3 and 4. FIG. 3 is a flow chart of a cellular confinement system manufacturing method according to the present application. FIG. 4 is a flow chart of a specific embodiment of steps of the cellular confinement system manufacturing method according to the present application.

A cellular confinement system manufacturing method is further provided according to the present application, which includes:

1) intercrossing PET sheets to form honeycomb-shaped cells;
2) providing a connecting hole at a joint where the PET sheets are intercrossed.
3) providing an injection molded fixing component at a connecting hole.

The PET sheets 1 are intercrossed to form honeycomb-shaped cells. Then the connecting hole 2 is provided at the joint where the PET sheets 1 are intercrossed. Finally, the injection molded fixing component 3 is provided at the connecting hole 2 to fix the PET sheets 1 into one piece at the joint where the PET sheets 1 are connected. Since the PET sheets 1 have a high high-temperature resistance, the PET sheets 1 are not deteriorated due to high temperature in plastic injection process. Also since the injection molded connecting component is formed by converting liquid into solid, the connection between the sheets is more secure. Therefore, the cellular confinement system has an improved overall strength, a prolonged service life, a simple manufacturing method and a low cost.

In a specific embodiment of the present application, the step 1) includes:
  step 11), intercrossing one PET sheet or two or more PET sheets;
  step 12), stretching the one PET sheet or the two or more PET sheets to form honeycomb-shaped cells.

Those skilled in the art may understand that the cellular confinement system may be formed by bending one PET sheet 1 into a certain extent or by intercrossing multiple PET sheets 1. After being intercrossed, the PET sheets 1 are stretched in multiple directions to form honeycomb-shaped cells.

In order to further optimize the above embodiments, step 2) may include:
  21) providing the two or more connecting holes, which are parallel and equally spaced, at the joint where the PET sheets are intercrossed.

With the two or more connecting holes 2, i.e., two or more connection points being provided at the joint where the PET sheets 1 are connected, the strength of the connection between the PET sheets 1 may be effectively improved, and thus the overall connection effect and the overall connection strength of the cellular confinement system are improved. The service life of the cellular confinement system is further prolonged. Also with the connecting holes 2 being equally spaced, the PET sheets 1 are more uniformly stressed when being subjected to an external stress.

Further, the step 3) includes:
  step 31), injecting molten plastic into the connecting holes by using a plastic injection molding machine to form an injection molded rod;
  step 32), injecting molten plastic to two ends of the injection molded rod by using the plastic injection molding machine to form fixing plates each at a corresponding end of injection molded rod;
  step 33), integrating the fixing plates by using the plastic injection molding machine.

Those skilled in the art may understand that plastic injection molding machine is a main molding apparatus which makes thermoplastic or thermoset plastic into plastic products of various shapes by utilizing a plastic forming mould.

It should be illustrated that the plastic injection molding machine has an integral forming function. Thus, the injection molded rod is formed in one process, and is formed into an integrated body, which has an improved overall strength.

In the cellular confinement system according to the present application, firstly, the PET sheets 1 are intercrossed to form honeycomb-shaped cells, and the connecting hole 2 is provided at the joint where the PET sheets are intercrossed, and then the PET sheets 1 are connected by an injection molded fixing component 3 at the joint where the PET sheets are intercrossed. The injection molded fixing component 3 includes an injection molded rod 31 arranged in the connecting hole 2 and a fixing plate 32 arranged to be fixedly connected to either end of the injection molded rod 31. The injection molded rod 31 is configured to connect the PET sheets 1 at the joint where the PET sheets are intercrossed. The PET sheets 1 may be fixed by the fixing plate 32, thus preventing the PET sheets 1 from being disengaged from the injection molded rod. The fixing plate 32 fits against a side wall of a corresponding PET sheet 1. In this way, the PET sheets 1 may fit closely against each other. Since the PET sheets 1 have a high high-temperature resistance, the PET sheets 1 are not deteriorated due to high temperature in mold injection process. Also since the injection molded connecting component is formed by converting liquid into solid, the connection between the sheets is more secure. Therefore, the whole strength of the cellular confinement system is improved and the service life of the cellular confinement system is also increased.

A cellular confinement system manufacturing method is further provided according to the present application. In the cellular confinement system manufacturing method, the PET sheets 1 are intercrossed to form honeycomb-shaped cells, then the connecting hole 2 is provided at a joint where the PET sheets 1 are intercrossed, and finally, an injection molded fixing component 3 is provided at the connecting hole 2 to fix the PET sheets 1 into an integral body at the joint where the PET sheets 1 are connected. Since the PET sheets 1 have a high high-temperature resistance, the PET sheets 1 are not deteriorated due to high temperature in mold injection process. Also since the injection molded connecting component is formed by converting liquid into solid, the connection between the sheets is more secure. Therefore, the whole strength of the cellular confinement system is improved and the service life of the cellular confinement system is also prolonged. Also the manufacturing method is simple and the cost is low.

The cellular confinement system and the method for manufacturing the cellular confinement system according to the present application are described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

What is claimed is:

1. A cellular confinement system, comprising PET sheets (1) and honeycomb-shaped cells formed by intercrossing the PET sheets (1), wherein
   three connecting holes (2) are provided at a joint where the PET sheets (1) are intercrossed and the three connecting holes (2) are equally spaced,
   an injection molded fixing component (3) for connecting the PET sheets (1) is provided at each of the three connecting holes (2),
   the injection molded fixing component (3) comprises an injection molded rod (31) arranged in each of the three connecting holes (2), and two fixing plates (32) arranged to be fixedly connected to two ends of the injection molded rod (31), respectively, and
   the two fixing plate (32) fits against a side wall of a corresponding PET sheet (1) and are integrated.

2. The cellular confinement system according to claim 1, wherein the cellular confinement system is formed by one PET sheet (1) or a plurality of PET sheets (1).

\* \* \* \* \*